No. 755,970. PATENTED MAR. 29, 1904.
E. B. WELLES.
WHIFFLETREE HOOK.
APPLICATION FILED OCT. 2, 1902.
NO MODEL.
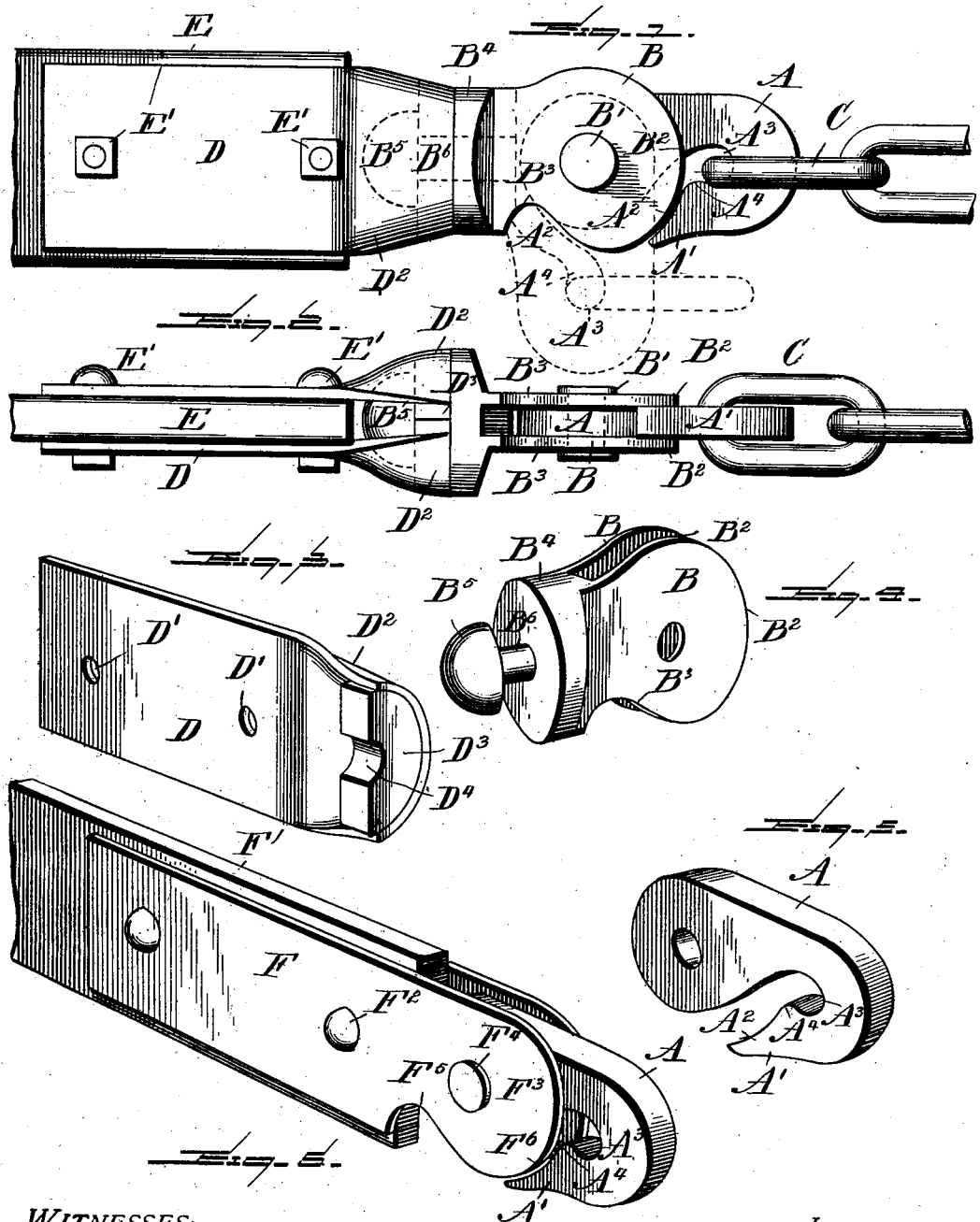
WITNESSES:
W. F. Doyle.
Alfred T. Gage
INVENTOR
Edward B. Welles
BY E. B. Stocking
Attorney No. 755,970.　　　　　　　　　　　　　　　　　　　Patented March 29, 1904.

UNITED STATES PATENT OFFICE.

EDWARD B. WELLES, OF ASHEVILLE, NORTH CAROLINA.

WHIFFLETREE-HOOK.

SPECIFICATION forming part of Letters Patent No. 755,970, dated March 29, 1904.

Application filed October 2, 1902. Serial No. 125,625. (No model.)

*To all whom it may concern:*

Be it known that I, EDWARD B. WELLES, a citizen of the United States, residing at Asheville, in the county of Buncombe, State of North Carolina, have invented certain new and useful Improvements in Safety Harness-Hooks, of which the following is a specification, reference being had therein to the accompanying drawings.

This invention relates to safety harness-hooks, and particularly to a hook having its free end coöperating with a guard-plate.

The invention has for an object to provide a hook pivoted in a supporting guard-plate provided at one side with a recess, said hook having its free end adjacent to the periphery of the plate and provided with a lip to form a seat within the hook to receive the connecting-link or other device secured thereto.

A further object of the invention is to provide a swiveling mounting for this hook adapted for connection to a trace or similar object.

Other and further objects and advantages of the invention will be hereinafter set forth and the novel features thereof defined by the appended claim.

In the drawings, Figure 1 is a side elevation of the invention; Fig. 2, a plan thereof, showing the bottom; Fig. 3, a perspective of one of the swiveling plates; Fig. 4, a similar view of the head within which the hook is mounted; Fig. 5, a perspective of the hook itself, and Fig. 6 is a perspective of a modified form of guard-plate.

Like letters of reference refer to like parts in the several figures of the drawings.

The letter A designates my improved hook, which is pivoted at one end to a supporting guard-plate B by means of a bolt B', while the opposite free end A' extends backward toward the pivot and at one side thereof. This end is provided with a curved or concaved face $A^2$, adapted to travel parallel with a corresponding convex face $B^2$ upon the outer periphery of the guard-plates, said plates being formed in pairs to constitute pivoting ears upon opposite sides of the hook. The guard-plates are also provided at one side and to the rear of the pivot with a recessed portion $B^3$, which permits the removal of the link or connecting device from the socket $A^3$, formed by the lip $A^4$ of the hook when the hook is in the dotted-line position shown in Fig. 1, and after the hook is returned to the full-line position the link is freed therefrom and disconnected from the hook. It will also be noted that when the hook is in the dotted-line position any back pressure upon the link throws the same against the lip $A^4$, thus retaining the link within the socket of the hook and preventing the same riding upward through the path of the hook, which extends in a compound curve to the recess $B^3$ of the guard-plate.

The free end of the hook is provided with a point constructed and arranged to engage the guard or supporting plate when the passage in the hook is in alinement with the recess in the plate, thus leaving no opening through which a link could be passed in the event of slack and requiring a positive movement of the hook away from the recess in the plate before the link can be removed therefrom.

The hook and plate heretofore described may be attached in any desired manner to the part by which they are to be carried; but I have shown in Figs. 1 to 5 a preferable form of such an attachment, wherein the plates $B^2$ are connected to or form a part of a base $B^4$, having extended therefrom at the opposite side to the plates a swiveling head B', connected by a stem $B^6$ with the base. This head is adapted to lie between two swiveling plates D, which may be placed upon opposite sides of the trace E or other article to which the hook is applied and bolted thereto by means of bolts E', passing through apertures D', formed in the plates. The extended ends of these plates are enlarged at $D^2$ to form a recess to receive the head $B^5$, which lies behind an end plate $D^3$, having a channel $D^4$ therein to admit the shank $B^6$ of the head. It will be seen that when the opposite plates are bolted together the head is securely held in position and permits a free swiveling motion of the hook carried by the plates upon the base $B^4$.

In Fig. 6 a modified form of the invention is shown in which the hook A is supported by plates F, secured to the trace F' by means of bolts $F^2$ and provided at their extended ends with guard-plates $F^3$, between which the hook is pivoted by means of a bolt $F^4$, said plates being provided with a recessed portion $F^5$ and curved periphery $F^6$ to coöperate with the free end $A'$ of the hook, as heretofore described. This hook is also provided with a socket $A^3$ and lip $A^4$ for holding the connecting link or eye C.

In the operation of the invention it will be seen that when the strain is upon the link or eye C the hook will be held in the position shown in full lines, with the link in the socket $A^3$, and when any slack occurs the hook will drop into the dotted-line position, and the lip $A^4$ then serves the important function of retaining the link in the socket $A^3$ and preventing the same pushing or riding upward through the opening in the hook. This result is also further accomplished by means of the compound curve given this opening, due to the presence of the eye $A^4$ and the concave face $A^2$, which extends parallel with the face $B^2$ of the guard-plate when the hook is under draft. It will thus be seen that there can be no accidental disengagement of the link from the hook by means of the slacking of the parts, as to disengage the parts requires a distinct movement of the link over the lip and along the curved face of the point of the hook and then the withdrawal of the hook from opposite the recess in the guard-plate. It will also be noted that the swiveling of the guard-plates carrying the hook prevents any twisting of the parts and allows a free movement of the hook, so that the same can be turned opposite the operator for the purpose of engaging or disengaging the link therefrom.

It will be obvious that changes may be made in the details of construction and configuration and the means of supporting the guard-plates and hook without departing from the spirit of the invention as defined by the appended claim.

Having described my invention and set forth its merits, what I claim, and desire to secure by Letters Patent, is—

In a safety harness-hook, a supporting-plate having a recess at one side thereof, a hook pivoted upon said plate and having its free end adjacent to the periphery of the plate and a point constructed and arranged to engage said plate when the passage of the hook is in alinement with the recess in the plate, and a curved lip upon the free end of the hook between the point and bend thereof extending laterally toward the opposite inwardly-curved wall to provide an abutment and a socket for a link at the bend therein when the passage of the hook is in alinement with said plate-recess.

In testimony whereof I affix my signature in presence of two witnesses.

EDWARD B. WELLES.

Witnesses:
J. E. SMATHERS,
CECILE CUTTER.